United States Patent [19]

Benoit

[11] Patent Number: 4,592,938

[45] Date of Patent: Jun. 3, 1986

[54] METHOD OF PRODUCING AN INTERNALLY REINFORCED THERMOPLASTIC FILM AND FILM AND ARTICLES PRODUCED THEREFROM

[75] Inventor: Gordon L. Benoit, Macedon, N.Y.

[73] Assignee: Mobil Oil Corporation, New York, N.Y.

[21] Appl. No.: 716,001

[22] Filed: Mar. 25, 1985

[51] Int. Cl.[4] .............................................. D04H 1/04
[52] U.S. Cl. ................................. 428/35; 156/244.12; 156/244.13; 156/244.15; 428/36; 428/292; 428/294
[58] Field of Search .................... 428/35, 36, 292, 294; 156/244.12, 244.13, 244.15

[56] References Cited

U.S. PATENT DOCUMENTS

| | | | |
|---|---|---|---|
| 3,034,941 | 5/1962 | Hessenthaler et al. | 264/171 |
| 3,372,920 | 3/1968 | Corbett et al. | 264/95 |
| 3,397,428 | 8/1968 | Donald | 18/13 |
| 3,577,308 | 5/1971 | Van Drunen | 428/294 |
| 4,410,587 | 10/1983 | Fair et al. | 428/247 |
| 4,410,602 | 10/1983 | Komoda et al. | 428/516 |
| 4,464,157 | 8/1984 | Benoit | 264/171 |

*Primary Examiner*—Marion C. McCamish
*Attorney, Agent, or Firm*—Alexander J. McKillop; Michael G. Gilman; Charles J. Speciale

[57] ABSTRACT

A method for producing an internally reinforced aeolotropic thermoplastic film web through coextrusion of two polymeric materials, and more particularly, a method of forming a film web possessing an enhanced tensile strength in at least the longitudinal or machine direction of the film web. A plastic film having internal striplike reinforcements entirely embedded within a matrix material is formed by the inventive method, and such film is utilized for various articles; for instance, plastic bags, bag components such as handles by liners, stretch wrap film, and the like.

20 Claims, 7 Drawing Figures

METHOD OF PRODUCING AN INTERNALLY REINFORCED THERMOPLASTIC FILM AND FILM AND ARTICLES PRODUCED THEREFROM

BACKGROUND OF THE INVENTION

1. Field of the Invention

The present invention relates to a method for producing an internally reinforced thermoplastic film web possessing an aeolotropic through coextrusion of two polymeric materials, and more particularly, a method of forming a film web possessing an enhanced tensile strength in at least the longitudinal direction of the film web. Moreover, the invention also relates to a plastic film having internal striplike reinforcements entirely embedded within a matrix material which is formed by the method pursuant to the invention, and especially pertains to articles formed from such a film; for instance, plastic bags, bag components such as bag handles or liners, stretch film, and the like.

Frequently, the utilization of articles formed of thermoplastic films which are constituted of polymers, such as polyethylene or the like, requires the film to possess a higher tensile strength in at least one direction of the film. For instance, plastic films have found widespread use in the manufacture of plastic bags or components thereof, such as supermarket grocery bags, which, when filled with product are subjected to extensive tensile stresses, and depending upon the bag construction, usually in the longitudinal direction of the film as a result of the weight of the bag contents. Such thermoplastic films are also frequently in the form of stretch films utilized as high-strength wrappers which are subjected to high tensile stresses in at least one direction of the film, usually the machine direction of the film web. Consequently, it has become desirable to reinforce such bags which are made from plastic film webs, whereby the film possesses a higher tensile strength in at least one direction of the film web; for instance, in the machine direction of the film webs.

2. Discussion of the Prior Art

Heretofore, greater tensile strength has been imparted to the film by either forming thickened portions in the thermoplastic film web during the forming thereof by extrusion through suitable slot dies or tubular dies, in which the film is imparted a somewhat higher tensile strength in the longitudinal or mechanic direction of the extruded film web.

Numerous solutions have been proposed to the problem in imparting an increased tensile strength to a thermoplastic film web, in at least one direction of the film, by the application of reinforcements to either one or both surfaces of the film web, and through adhesive or thermal bonding therewith. However, this has evidenced itself to necessitate the use of relatively complex and expensive forming processes, which will not in all instances lead to the desired increase in tensile strength or tear resistance in one direction of the thermoplastic film web, such as the machine direction of the web.

Fair, et al. U.S. Pat. No. 4,410,587 discloses a coextruded fusible thermoplastic film material in the shape of a net in which laminations are provided in order to form a center layer of a high-melt-strength polymer with a low-melt-strength polymer being applied on both sides thereof. This disclosure provides for a relatively complex and expensive mode of producing a reinforced thermoplastic film material.

Komoda, et al. U.S. Pat. No. 4,410,602 discloses an extended reclaimed synthetic resin film in which a different type of an encompassing resin layer is formed by being coextruded through a composite die. This process and the film produced thereby would not be economical for high volume thermoplastic film usage generally employed in single, throw-away applications, such as grocery sacks or the like.

Hessenthaler, et al. U.S. Pat. No. 3,034,941 discloses the formation of extruded beads or strips being applied to the surface of or incorporated into a thermoplastic film material subsequent to extrusion. This will not permit the desired additional tensile strength to be imparted to the lower strength polyethylene film in a manner as contemplated herein, and concurrently necessitates the employment of more complex and expensive equipment to form the composite plastic film wrapping material structure.

Donald U.S. Pat. No. 3,397,428 discloses the formation of composite articles formed from a thermoplastic resinous material, in which a resinous material of one type is encased within a second resinous or polyethylene material to provide an insert of higher strength. Again, this does not provide the inexpensive manner of forming an internally reinforced atropic plastic film material, particularly when desired for high-volume disposable, low-cost or grocery sacks.

Benoit, et al. U.S. Pat. No. 4,464,157 discloses a method of forming a gussetted thermoplastic bag incorporating reinforced carrying handles formed integrally with the bag walls. This type of bag construction necessitates the extrusion of thermoplastic film webs having a somewhat greater film thickness in the regions employed for the bag handles which are formed by at least two coextruded film layers. Although providing a superior thermoplastic bag with an improved tear resistance and tensile strength in at least one film direction, accurate control over the formation of the bags is rendered difficult due to the varying film thickness across the film web as the web is advanced through bag making equipment currently available in this technology.

Various other types of apparatus and methods for producing composite and/or reinforced thermoplastic film materials are described, for instance, in Corbett, et al. U.S. Pat. No. 3,372,920, and in numerous foreign publications, such as European Pat. No. 32629, and Japanese Patent Publications No. 6194, 14022, and 120792. None of these, however, describe a forming method and internally reinforced film having the aeolotropic properties contemplated herein which is particularly adapted for low-cost bags, stretch films, or similar disposable articles, and wherein these articles are formed through a coextrusion method forming an aeolotropic film analogous to that contemplated herein.

SUMMARY OF THE INVENTION

Accordingly, the present invention provides for the production of an internally reinforced aeolotropic or anisotropic thermoplastic film material through the continuous coextrusion of a plurality of internal reinforcing strips or stripes of a first thermoplastic material within a second thermoplastic material matrix so as to provide longitudinally extending, spaced strips or stripes of the first thermoplastic material, imparting a greater tensile strength in the longitudinal or machine direction to the film web which is being coextruded therewith than the strength of the matrix material itself encompassing each such strip. The strips which are entirely embedded within the matrix material of the thermoplastic film web without physically increasing the thickness of the film material may be constituted of a polymer having a higher tensile strength than that of the material of the film matrix per se, thereby imparting to the film web, and consequently any articles, such as bags or grocery sacks, or stretch film produced from this film web, a higher tensile strength in the longitudinal machine direction. The coextrusion of such similar polymers which a higher tensile strength to the film web in one direction thereof provides for a simple and inexpensive internal reinforcement of the formed film web, which is not at all contemplated by the prior art. A thermoplastic film incorporating such internal reinforcements, which constitutes an aeolotropic composite thermoplastic film structure having a uniform film thickness, can be readily employed in the formation of such grocery sacks or bags, bag liners or bag handles, and other types of wrapping materials such as stretch films in which a higher tensile strength is desired in one direction of the film rather than the other, to thereby impart a greater load carrying capacity to the film material in an inexpensive and highly economical manner; and through the utilization of apparatus or equipment currently employed in this technology.

Accordingly, it is a primary object of the present to provide a method of producing a coextruded, internally reinforced aeolotropic thermoplastic film web material possessing an increased tensile strength and tear resistance in at least the longitudinal or machine direction of the film web.

A more particular object is to provide a method of the type described herein in which an internally reinforced, composite aeolotropic thermoplastic film web is produced through the coextrusion of spaced strips or stripes of a first thermoplastic material are fully embedded within a matrix formed by a second thermoplastic material and in which the strips impart a higher tensile strength film web, without increasing the thickness of the film, in at least the longitudinal or machine direction of the film web.

Another object of the present invention resides in the provision of a method of producing a composite, internally reinforced aeolotropic thermoplastic film material having a higher tensile strength in the longitudinal or machine direction of the film material, which is particularly adapted for use as a bag or wrapping material, such as a stretch film, possessing a high tensile strength and tear resistance.

Yet another object of the present invention is to provide a coextruded, internally reinforced aeolotropic thermoplastic film web material which is produced in accordance with the inventive method.

A still further object of the invention is to provide an article, such as a bag, grocery sack, bag liner or handle, or stretch film, which is constituted of the novel and inventively internally reinforced aeolotropic thermoplastic material.

BRIEF DESCRIPTION OF THE DRAWINGS

The foregoing and other objects of the present invention may be more readily ascertained by referring to the following detailed description of an exemplary embodiment thereof, taken in conjunction with the accompanying drawing; in which.

DETAILED DESCRIPTION

Figure 1:
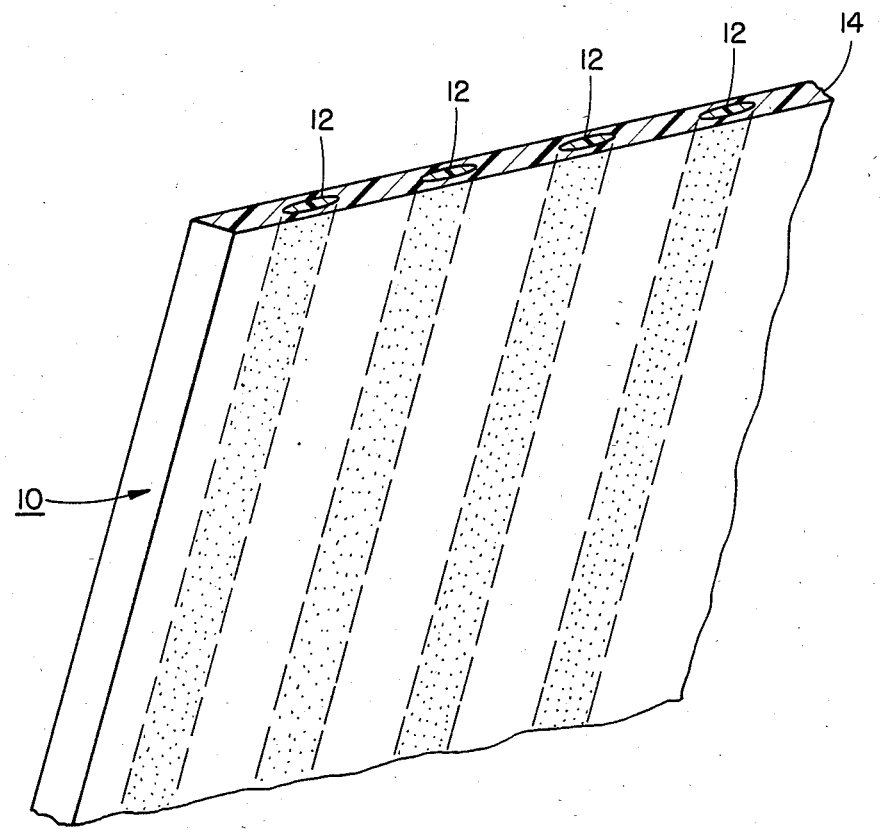
FIG. 1 diagrammatically illustrates, on an enlarged scale, a segment of a composite aeolotropic thermoplastic film web material produced pursuant to the invention.

Referring now in detail to FIG. 1 of the drawings, there is illustrated in a perspective representation on an enlarged scale, a segment of a composite, internally reinforced thermoplastic aeolotropic film web material 10 pursuant to the invention, which is produced through the coextrusion of two polymers, preferably different types of olefins or polyethylene having differing tensile strengths. Concerning the definition of an aeolotropic thermoplastic film material, also referred to as an anisotropic material, this signifies that the film web has different tensile strengths and/or tear strength or resistance in different directions thereof.

Thus, the thermoplastic aeolotropic film 10 may be extruded as a flat sheet or web through a flat or slot die, or as a tubular film through a tubular die, as is well known in the technology pertaining to the extrusion of thermoplastic films.

In this instance, the composite, internally reinforced aeolotropic thermoplastic film may be produced by coextruding parallel spaced discrete strips or flat stripes 12 in the machine direction, each constituted of a first thermoplastic material, such as suitable polyolefin or polyethylene resins, and concurrently coextruding therewith a second polyethylene or thermoplastic resin 14 about the strips, to thereby form the matrix of the film web entirely encompassing each of the strips 12. Suitably, during extrusion, the strips or stripes 12 are arranged at predetermined spacings relative to each other, depending upon the increased tensile strength and tear strength desired for the composite, internally reinforced aeolotropic thermoplastic film web in the longitudinal or machine direction of the film web 10.

It is possible to contemplate the utilization of various types of thermoplastic materials or compositions for the strips or stripes 12 and for the encompassing matrix 14 of the film web 10 in order to impart the desired increased tensile strength and tear resistance thereto, such as in the longitudinal or machine direction of the film web. For instance, by way of example, in one particular instance, both thermoplastic materials for the film matrix portion 14 and the strips 12 may be constituted of polyethylene, in which the strips are constituted of a higher strength polyethylene. Alternatively, numerous other types of polymers can be utilized, as is well known in the technology pertaining to the production of thermoplastic films.

Figure 2:
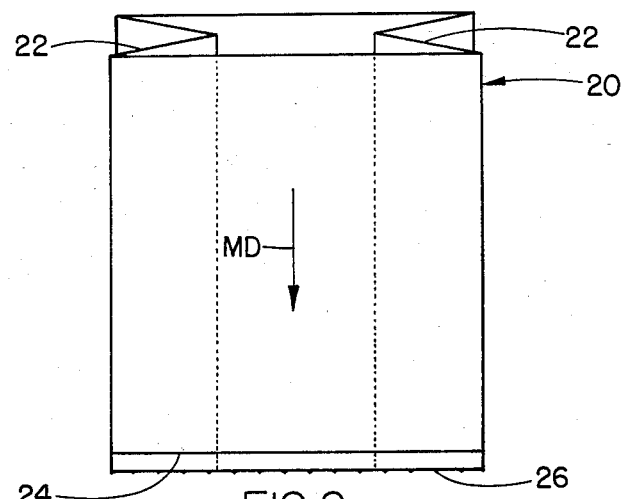
FIG. 2 illustrates a prior art bag liner utilized for general products.

As shown in FIG. 2 of the drawings, a prior art in film bag liner or general products bag liner 20 includes a gussetted structure 22, and incorporates end seals 24, and is thereafter separated along perforated line 26 from a continuous web, as is well known in the thermoplastic bag manufacturing technology. Generally, such bags are manufactured from a tubular film web wherein the machine direction MD extends along the depth or height of the bag. Generally, many major failures of such bags during use thereof are produced by tears and punctures in the lower half of the bag toward the end seal 24, either due to sharp objects within the bag or the weight of the various objects contained therein. Consequently, heretofore, this problem has been attacked by providing internal or external reinforcements to the extruded plastic film, such as by the application of strips of other plastic material, or constructing the bag liners of a laminate which increases the tear resistance and the tensile strength, preferably in the machine direction of the film web. This, however, renders the manufacture of such bags relatively complex and, as a result, extremely uneconomical.

Figure 3:
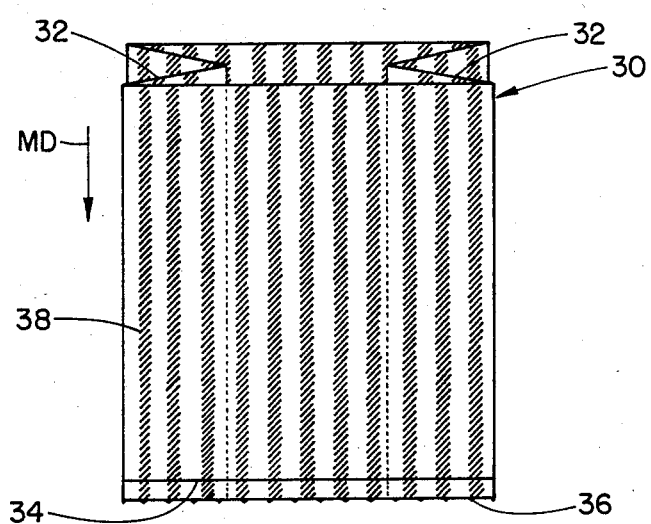
FIG. 3 illustrates an aeolotropic thermoplastic film bag liner according to the invention.

The present invention, overcomes this problem encountered in the production of thermoplastic bag liners by providing an aeolotropic film structure, as is disclosed in FIG. 3 of the drawings showing a bag liner 30, having a structure and configuration similar to that of the prior art bag liner 20. In this instance, however, the aeolotropic bag liner 30 which also incorporates a gusset structure 32, an end seal 34, and perforations 36 for separating the film web into individual bags the bag liner 30 includes a plurality of internal reinforcements 38 extending in the machine direction MD of the film bag, such internal reinforcements 38 being formed by internal strips or stripes embedded within the matrix material, as described hereinabove, so as to form an aeolotropic structure adding additional strength to the bag in the required direction. By suitably selecting the resins of the strips 38, or alternatively or concommitantly that of the bag matrix material, it is also possible to incorporate a higher degree of stiffness in the bag liner, and thereby impart greater toughness to the body of the liner 30. The strips 38 also increase the tear resistance of the bag in a direction transverse to the machine direction, by preventing propagation of any tears or rips in the bag across the bag.

Figure 4:
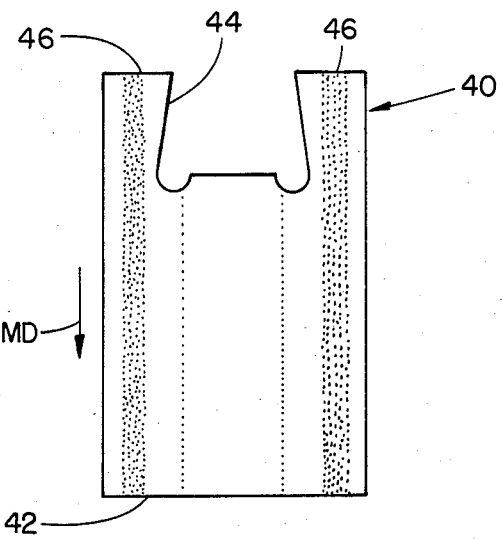
FIG. 4 illustrates a prior art gussetted grocery sack.

FIG. 4 illustrates a typical prior art thermoplastic grocery sack or bag 40 which is formed of a continuous thermoplastic film web material, and preferably of a tubular lay flat film, having a transverse seal 42 formed at the bottom end thereof, and provided with a cutout 44 at its upper end section to constitute a pair of handles 46 as well known in the grocery bag making technology. Frequently, additional strength is required in the handle areas, particularly since the bags are employed for carrying heavy articles such as produce canned and bottled items, and heavy groceries, and at times also require heavier strength and toughness in the body film area of the grocery sack due to the weights carried therein. This is frequently compensated for by either making the body portion of the grocery sack of a heavier thickness, whereby the nonuniform thickness of the bag across its width will generate difficulties in the continuous processing of the thermoplastic film web. Alternatively, additional strength may be imparted to such prior art bags or sacks by laminating a further film material thereon in the areas of the handles 46, extending down in the machine direction MD, such as is disclosed in applicant's earlier U.S. Pat. No. 4,464,157. This, although providing a satisfactory solution to imparting additional strength to the grocery sacks or bags, especially in the region of the handles 46, renders the cost of such bags high, and the method of manufacturing them somewhat complex.

Figure 5:
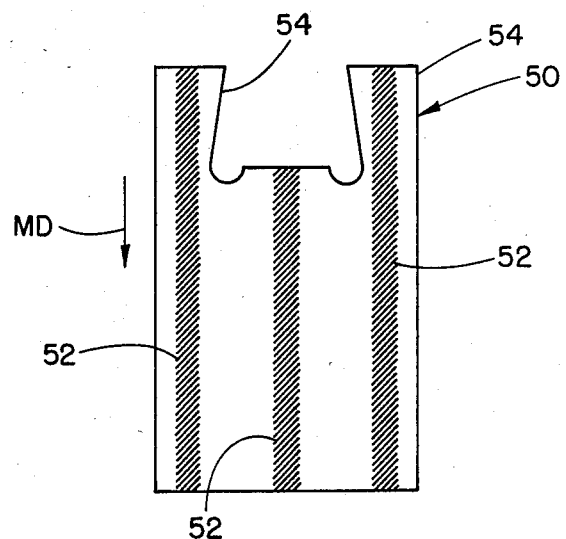
FIG. 5 illustrates an aeolotropic thermoplastic grocery sack according to the invention.

Pursuant to the present invention, as illustrated in FIG. 5 of the drawings, the bags are formed of a thermoplastic film material of uniform thickness, wherein the grocery bag or sacks 50 incorporate internal reinforcements 52 extending in the machine direction MD so as to project through the handle portions 54 to form an aeolotropic film structure. When defined, as shown, similar reinforcing strips 52 extending in the machine direction may also be provided in one or two regions in the centered body area of the grocery sack or bag 50 to help support the load carried within the bag in the central body region of the bag. This will also inhibit the propagation of any tears formed in the bag by the articles carried therein transversely of the machine direction.

Figure 6:
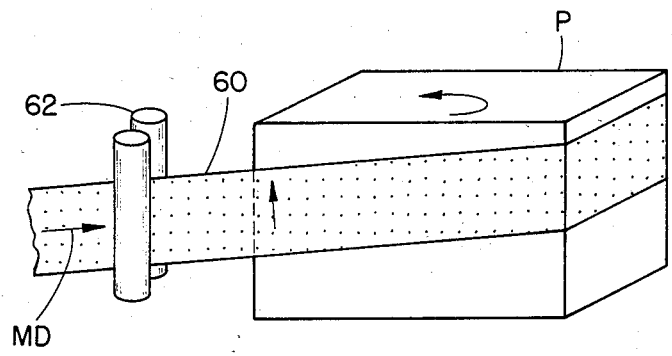
FIG. 6 illustrates a prior art stretch film utilized as a wrapper.

Another utilization of a thermoplastic film is in the form of a stretch film 60, as shown in FIG. 6 of the drawings, illustrating a prior art film process of being wrapped about an article or package P, with the bags being fed between rollers 62 in the direction of arrow MD defining the machine direction of the film web. Any tears encountered within the film will rapidly propagate across the film towards the edge hereof, causing the film web 60 to be torn apart.

Figure 7:
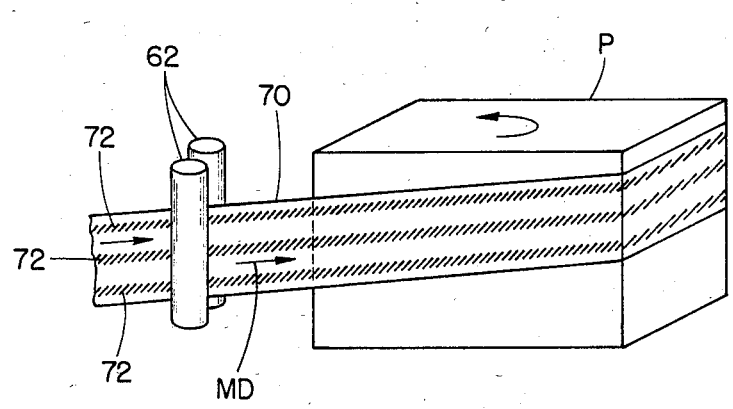
FIG. 7 illustrates an aeolotropic thermoplastic stretch film pursuant to the invention utilized as a wrapper.

The foregoing problem encountered in the prior art is overcome by the inventive stretch film 70, as illustrated in FIG. 7 of the drawings, wherein a plurality of parallel spaced, internal reinforcing strips of a further thermoplastic resin 72, forming an aeolotropic film structure accordance with the inventive coextrusion method, extends in the machine direction MD, and not only increases the tensile strength of the film in the machine direction, but also inhibits the propagation of any tears across the strips and thereby the width of the film web 70 due to the higher strength internal reinforcements 72 provided within the matrix.

This will inhibit any major failures of the films employed as either liners, grocery sacks, or stretch films and the like caused by punctures and tears in the film which, in the prior art, normally would result in continuing tears which would readily break the web or tear the bags.

From the foregoing, it is readily apparent that the present invention provides for a simple and inexpensive, internally reinforced aeolotropic thermoplastic film material having an improved tear resistance and a high degree of tensile strength in one longitudinal direction, such as the machine direction of the extruded film web, and which readily and economically lends itself to numerous applications in industry and technology.

While there has been shown and described what are considered to be preferred embodiments of the invention, it will of course be understood that various modifications and changes in form or detail could readily be made without departing from the spirit of the invention. It is therefore intended that the invention be not limited to the exact form and details herein shown and described, nor to anything less than the whole of the invention herein disclosed as hereinafter claimed.

What is claimed is:

1. An internally reinforced aeolotropic thermoplastic film web constituted of coextruded thermoplastic resins having an increased tear resistance and tensile strength in at least the longitudinal or machine direction of said film web; comprising:
(a) a first thermoplastic resin forming a matrix for said thermoplastic film web; and (b) a plurality of discrete parallel spaced continuous strips or stripes of a second thermoplastic resin embedded entirely within the confines of said first film web-forming thermoplastic matrix and extending in the machine direction of said film web to constitute said internally reinforced aeolotropic thermoplastic film having said increased tensile strength.

2. A film web as claimed in claim 1, wherein said first and second thermoplastic resins are each constituted of a polyolefin.

3. A film web as claimed in claim 1, wherein the matrix of said film web is constituted of polyethylene, and said strips or stripes embedded within said film are constituted of a polyethylene having a greater tensile strength than said polyethylene film.

4. A film web as claimed in claim 3, wherein said thermoplastic strips or stripes are constituted of a higher-tensile strength polyethylene than the polyethylene material of said matrix.

5. A film web as claimed in claim 1, wherein said film web is a flat extruded film, and said strips or stripes are spaced within said film matrix and extend in the machine direction of said film web.

6. A film web as claimed in claim 1, wherein said film web is a tubular film, said strips or stripes being spaced about the circumference of said film and extending in the machine direction of the film.

7. A film web as claimed in claim 1, wherein said internally reinforced aeolotropic thermoplastic film is utilized in producing plastic bag structures.

8. A film web as claimed in claim 7, wherein said internally reinforced aeolotropic thermoplastic film is incorporated in handle portions of said bag structures.

9. A film web as claimed in claim 1, wherein said internally reinforced aeolotropic thermoplastic film is formed into bag liners.

10. A film web as claimed in claim 1, wherein said film is formed into a stretch wrap film web.

11. A method of producing an internally reinforced aeolotropic thermoplastic film web constituted of coextruded thermoplastic resins, said film having an increased tensile strength in at least the longitudinal or machine direction of said film web; comprising the steps of:

(a) extruding a first thermoplastic resin through an extrusion die orifice so as to form said resin into a matrix for said thermoplastic film web;

(b) concurrently extruding a plurality of discrete continuous strips or stripes of a second thermoplastic resin through said die orifice, said strips extending in parallel spaced relationship in the machine direction of said film web, and said strips being embedded entirely within the confines of said first film web-forming thermoplastic matrix so as to produce said internally reinforced aeolotropic thermoplastic film web.

12. A method as claimed in claim 11, wherein said first and second thermoplastic resins are constituted of a polyolefin.

13. A method as claimed in claim 11, wherein the matrix of said film web is constituted of polyethylene, and said strips or stripes embedded within said film are constituted of a polyethylene having a greater tensile strength than said polyethylene film.

14. A method as claimed in claim 13, wherein said thermoplastic strips are constituted of a higher tensile strength polyethylene than the polyethylene material of said matrix.

15. A method as claimed in claim 11, wherein said film web a flat extruded film, and strips are spaced across the width of said film matrix and extend in parallel along the machine direction of said film web.

16. A method as claimed in claim 11, wherein said film web is a tubular film, said strips being spaced about the circumference of said film and extending in parallel along the machine direction of said film.

17. A method as claimed in claim 11, wherein said internally reinforced aeolotropic thermoplastic film is utilized in producing plastic bag structures.

18. A method as claimed in claim 17, wherein said internally reinforced aeolotropic thermoplastic film has said strips extending along handle portions of said bag structures to form reinforcements along the handles.

19. A method as claimed in claim 11, wherein said internally reinforced aeolotropic thermoplastic film is formed into a bag liners.

20. A method as claimed in claim 11, wherein said internally reinforced aeolotropic thermoplastic film is formed into a a stretch wrap film web.

* * * * *